Nov. 19, 1929.   B. F. SCHMIDT   1,736,330
GEAR SHIFT MECHANISM
Filed Dec. 27, 1927   2 Sheets-Sheet 1

INVENTOR
B. F. Schmidt
BY
ATTORNEY

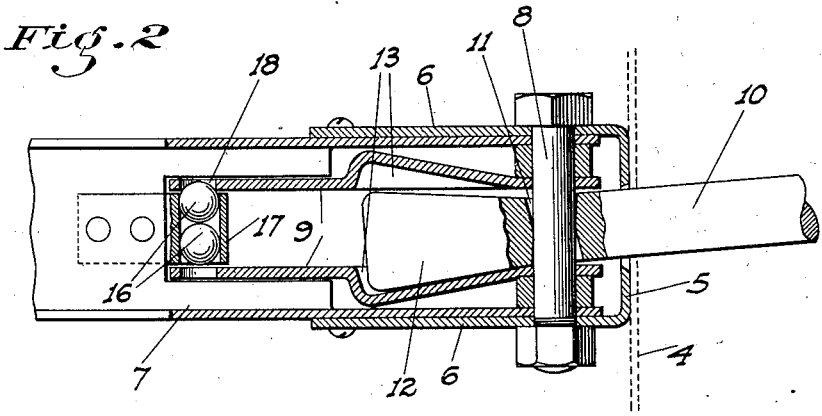
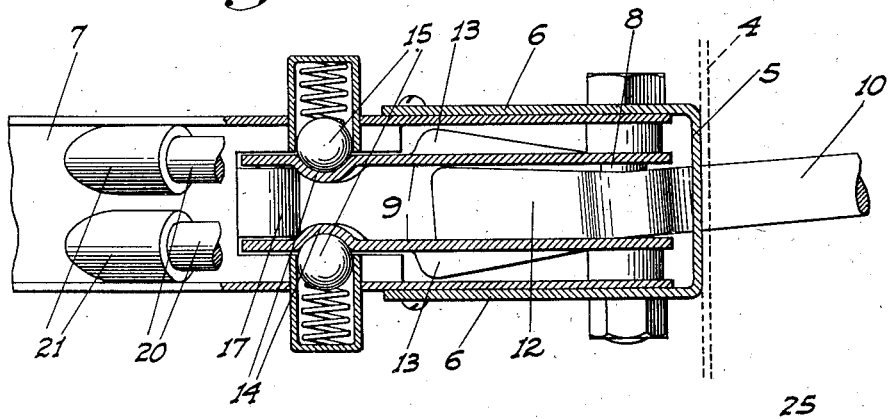
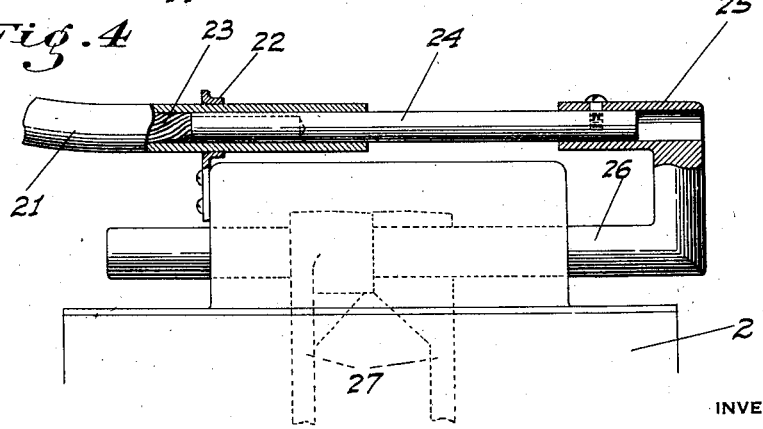

Patented Nov. 19, 1929

1,736,330

UNITED STATES PATENT OFFICE

BENJAMIN F. SCHMIDT, OF LOS ANGELES, CALIFORNIA

GEAR-SHIFT MECHANISM

Application filed December 27, 1927. Serial No. 242,670.

This invention relates to improvements in gear shifting mechanism for motor vehicles and particularly represents improvements over that type of mechanism shown in my Patent No. 1,630,076, dated May 24, 1927.

The principal object of the present invention is to provide a two cable device for shifting the gear fork rods, which maintains the advantageous features obtained with the device of the patent above mentioned, but which has selective control means for the cables arranged to make use of the present standard shift-lever movements.

A further object of this invention is to arrange the parts of the device so that the number of such parts is very few, they are extremely simple and as a result a very inexpensive construction is had, with nothing to get out of order. At the same time the efficiency of operation has not been sacrificed to simplicity and inexpensiveness as will be evident from a perusal of the following description.

These objects I accomplish by means of such structure and relative arrangement of parts as will fully appear by a perusal of the following specification and claims.

In the drawings similar characters of reference indicate corresponding parts in the several views:

Fig. 2 is an enlarged sectional plan of the operating mechanism taken on the line 2—2 of Fig. 1.

Fig. 3 is a similar view taken on the line 3—3 of Fig. 1.

Fig. 4 is a fragmentary longitudinal section of a cable and its housing at the lower end, showing the connection of the cable with a gear shift rod.

Figure 1:
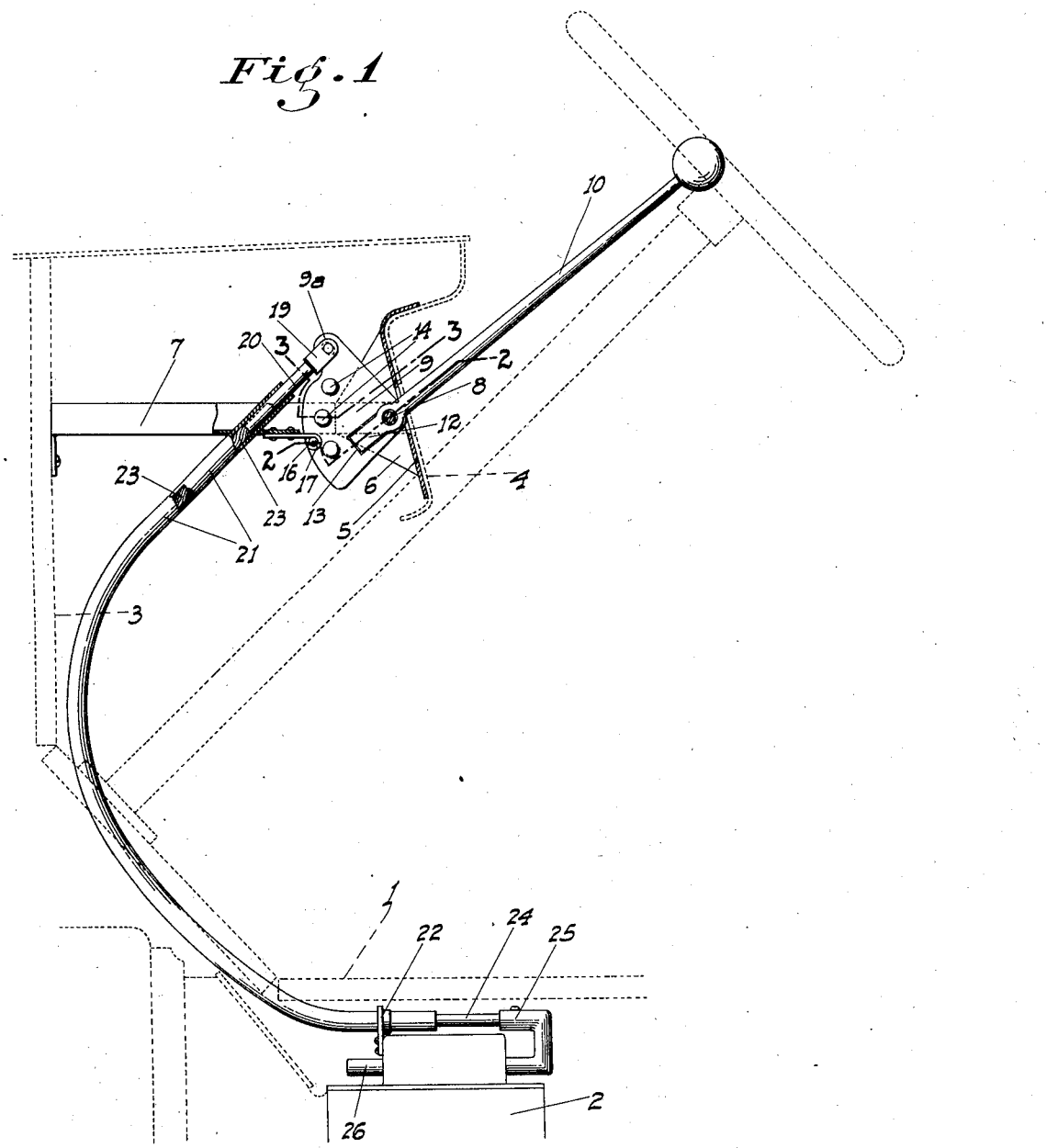
Fig. 1 is a side elevation of my improved gear shift mechanism as applied to a motor vehicle, one of the cables being partly removed and its operating plate being also removed.

Referring to the numerals of reference on the drawings, 1 denotes the floor of the driver's compartment of a motor vehicle, under which the usual transmission or gear box 2 is disposed. 3 indicates the customary bulkhead projecting upwardly from the floor at the rear of the engine and 4 is the dashboard positioned a certain distance rearwardly of said bulkhead.

Permanently mounted on the front face of the dashboard by welding or the like is a bracket 5 having a pair of transversely spaced ears 6 projecting forwardly therefrom. Secured to and projecting forwardly from the bracket to the bulkhead is a brace member which is preferably a channel shaped element 7, whose bottom is cut away from the back of the bracket to a point some distance ahead of the same.

A transverse pin 8 is mounted in the ears adjacent their rear ends, on which pin is individually turnable a pair of transversely spaced plates 9. Likewise turnably mounted on the pin between the plates is an operating lever 10, which extends upwardly and rearwardly a certain distance so as to be convenient to the driver. The hole 11 in the lever through which the pin passes is tapered outwardly both ways from the center so as to permit of a certain amount of lateral tilting movement of the lever about the pin. The lower end of the lever beyond the pin is preferably formed as a rectangular head 12. This head is adapted to project into either at a time of normally transversely alined recesses 13 which are depressed in the plates from their adjacent inner faces. These recesses slope inwardly toward the pin so that when the lever is tilted to one side so that the head 12 enters the corresponding recess, the adjacent side face of the head will longitudinally aline with the bottom of the recess. The width of the head is such that when engaged with one recess its opposite side will just clear the inner face of the other plate. It will therefore be seen that if the lever is then rotated about the pin up or down, one plate will be rotated while the other will remain stationary and the lever head cannot then leave the recess into which it was originally initially moved.

To locate and yieldably hold the plates in any predetermined position to which they may be moved they are provided with arcuately spaced sockets 14 in their outer faces to receive spring pressed balls 15 which are mounted in opposed and fixed relation in the bracket. To prevent one plate from moving while the other is being shifted, I provide an interlocking device which comprises a pair of transversely disposed balls 16 slidably mounted in a sleeve 17 fixed on the channel 7 between the plates, said balls being arranged to project into orifices 18 in the plates. The combined diameter of both balls is greater than the space between the plates so that when either plate is shifted from its neutral position said balls are forced to slide transversely so as to clear said one plate but to engage the orifice 18 of the other plate, thereby preventing movement thereof.

The plates in the top are provided with outwardly projecting ears 9ª to which yokes 19 are individually pivoted. The stems 20 of these yokes are slidable in the ends of rigid tubular housings 21 which are secured at their upper ends in transversely spaced relation to the channel 7. Said housings then extend downwardly at a suitable curvature to a point adjacent the bulkhead and then curve under the floor to a rearwardly facing termination on top of the gear box 2. At their lower ends these housings are secured to said box by a suitable bracket 22.

Secured to the inner ends of the stems 20 are flexible cables 23 which extend through and snugly fit in the housings so that they cannot buckle when pushed. These cables terminate in the housings adjacent their lower ends, to which ends said cables are connected to rigid rods 24 which are slidable in the rear ends of the housings and project rearwardly therefrom to a point beyond the rear end of the gear box. At their rear ends the rods are adjustably secured in sleeves 25 which are formed with or attached to the corresponding shifting rods 26 of the transmission, to which rods the usual shift forks 27 are secured. The adjustment of the rods 24 in the sleeves 25 permits of the proper positioning of the shifting rods relative to the plates 9 as may be necessary due to any slight variation in the length of the cables, either when initially assembled or with any stretch due to usage.

The bracket, plates and channel may all be made as stampings, requiring no machine work, and the other parts are of a similar simple and inexpensive nature, and the entire structure is very easy to assemble. The cost of production may therefore be kept very low, and the expense of upkeep is negligible, since there is practically nothing to wear out.

From the foregoing description it will be readily seen that I have produced such a device as substantially fulfills the objects of this invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear shift mechanism for a motor vehicle having a dashboard, comprising a bracket secured onto the dashboard, transversely spaced plates mounted in connection with the bracket and arranged for independent movement, a lever projecting between the plates and extending thence rearwardly and upwardly from the dashboard, a common transverse pivot in the bracket for the plates and lever, the latter being arranged to rock on the pivot laterally of the vehicle, means between the lever and plates for enabling the lever to be operatively and selectively engaged with either plate when said lever is rocked one way or the other, whereby if said lever is then turned on its pivot the plate will be likewise turned, and flexible elements operatively connected at their lower ends with the gear-shift rods of the gear mechanism and at their upper ends onto the plates at points offset from the pivot.

2. A gear shift mechanism for a motor vehicle having a dashboard, comprising a bracket secured onto the dashboard, transversely spaced plates mounted in connection with the bracket and arranged for independent movement, a lever projecting between the plates and extending thence rearwardly and upwardly from the dashboard, a common transverse pivot in the bracket for the plates and lever, the latter being arranged to rock on the pivot laterally of the vehicle, a head on the lever in front of the pivot, the plates having normally opposed recesses depressed from their adjacent faces to selectively receive the head therein when the lever is rocked in a corresponding direction, and individual connections between the plates and the shift members of the gear mechanism to cause the turning of the plates to effect the movement of said members.

3. A gear shift mechanism for motor vehicles including transversely spaced elements relatively movably mounted, a bracket extending between the bulkhead and dashboard of the vehicle on which said elements are mounted, a lever projecting between the elements and movably mounted with respect thereto, means between the levers and elements for enabling the lever when moved to operatively and selectively engage with either element for simultaneous movement thereof with said lever and to be locked to the element during such movement, and a cable connection between each of said elements and the gear shift rods of the gear mechanism.

4. A gear shift mechanism for a motor vehicle including transversely spaced and relatively movable plates, bracket means supported between the bulkhead and dashboard of the vehicle on which the plates are mounted, said plates having recesses oppositely disposed when the plates are in a neutral position, a lever projecting between the plates and movably mounted on the bracket with respect to the plates and of a width substantially that of the space between the plates, said lever being adapted to engage in said recesses for operation of each plate independently of the other, and an operative connection between each of said plates and the gear shift rod of the gear mechanism.

5. In combination with the bulk head of a motor vehicle and a dash board spaced from said head, a brace member extending between and secured to said bulk head and dash board, a gear shift actuating mechanism mounted on said brace member, operative connections between said mechanism and the gear mechanism of the vehicle, and a movably mounted shift lever extending through said dash board with its end adapted to operatively engage said mechanism.

In testimony whereof I affix my signature.

BENJAMIN F. SCHMIDT.